United States Patent
Mukaida et al.

(10) Patent No.: US 11,249,895 B2
(45) Date of Patent: Feb. 15, 2022

(54) MEMORY CONTROLLER AND MEMORY SYSTEM

(71) Applicant: TDK CORPORATION, Tokyo (JP)

(72) Inventors: Naoki Mukaida, Tokyo (JP); Kenichi Takubo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/558,464

(22) Filed: Sep. 3, 2019

(65) Prior Publication Data
US 2020/0133837 A1    Apr. 30, 2020

(30) Foreign Application Priority Data

Oct. 24, 2018   (JP) .............................. JP2018-200368

(51) Int. Cl.
| | |
|---|---|
| G06F 12/00 | (2006.01) |
| G06F 12/02 | (2006.01) |
| G06F 9/4401 | (2018.01) |
| G06F 12/06 | (2006.01) |
| G06F 11/20 | (2006.01) |

(52) U.S. Cl.
CPC ........ G06F 12/0246 (2013.01); G06F 9/4403 (2013.01); G06F 11/201 (2013.01); G06F 12/0638 (2013.01)

(58) Field of Classification Search
CPC ............. G06F 12/0246; G06F 12/0638; G06F 9/4403; G06F 11/201
See application file for complete search history.

(56) References Cited

U.S. PATENT DOCUMENTS

| | | | |
|---|---|---|---|
| 7,043,664 B1* | 5/2006 | Chiloyan ............ | G06F 11/1417 714/5.11 |
| 2005/0160217 A1 | 7/2005 | Gonzalez et al. | |
| 2012/0265921 A1* | 10/2012 | Post .................... | G06F 12/0638 711/103 |
| 2018/0191521 A1* | 7/2018 | Ahmed ............... | H04L 12/2809 |

FOREIGN PATENT DOCUMENTS

| | | |
|---|---|---|
| JP | 2007-518166 A | 7/2007 |
| WO | 2005/066773 A1 | 7/2005 |

* cited by examiner

*Primary Examiner* — Craig S Goldschmidt
(74) *Attorney, Agent, or Firm* — Oliff PLC

(57) ABSTRACT

A memory controller for preventing the storage area of a flash memory being reduced is provided. The memory controller controlling access to a flash memory based on a command provided from a host system, the memory controller includes: a processor, a RAM (random access memory), and a mask ROM (read only memory) in which a first firmware is written, wherein the memory controller is configured to: perform a search for a second firmware written in the flash memory based on the first firmware at a start-up time; and write a third firmware provided from the host system in the RAM when the second firmware is not found through the search and perform an initialization based on the third firmware written in the RAM.

12 Claims, 4 Drawing Sheets

MEMORY CONTROLLER AND MEMORY SYSTEM

CROSS-REFERENCE TO RELATED APPLICATION

Priority is claimed on Japanese Patent Application No. 2018-200368, filed Oct. 24, 2018, the content of which is incorporated herein by reference.

BACKGROUND OF THE INVENTION

Field of the Invention

The present invention relates to a memory controller and a memory system.

Description of Related Art

Technology associated with flash memory has been studied and developed.

In this regard, a memory system including a flash memory and a memory controller which controls the flash memory is known (see Patent Document 1). The memory controller has a processor, a mask ROM (read only memory) in which firmware for starting the memory system is stored in advance, and a RAM (random access memory) to which the firmware stored in the flash memory is read out. The firmware includes firmware which mainly performs ordinary processing determined according to standards and firmware which initializes the memory system. In this description of related art, for convenience of description, the firmware which performs ordinary processing determined according to standards is referred to as ordinary processing firmware, and the firmware which initializes the memory system is referred to as initialization firmware.

RELATED ART DOCUMENTS

Patent Documents

[Patent Document 1] Published Japanese Translation No. 2007-518166 of the PCT International Publication

SUMMARY OF THE INVENTION

In the conventional memory system disclosed in Patent Document 1, the firmware stored in the flash memory includes both the ordinary processing firmware and the initialization firmware as described above. For this reason, in the memory system, the amount of data frequently becomes large in the firmware stored in the flash memory.

Meanwhile, in the case of initializing the conventional memory system disclosed in Patent Document 1, the firmware including both the ordinary processing firmware and the initialization firmware is received in the memory system from a host system which controls the memory system, and the received firmware is written in the RAM. Then, the memory system performs initialization of the memory system on the basis of the firmware written in the RAM. After that, the memory system store the firmware in the flash memory. As a result, after the memory system is initialized, an area in which data desired by a user is stored in the storage area of the flash memory is reduced to the extent of the initialization firmware in the memory system. Also, in the memory system, the size of the storage area of the RAM is required to be large enough that the firmware can be written, and thus it is difficult to reduce the storage area of the RAM in some cases.

The invention was made in consideration of the above-mentioned circumstances, and an objective thereof is to provide a memory controller and a memory system for reducing both a storage area of the first RAM and a storage area in which firmware is stored in a storage area of the flash memory.

According to an aspect of the present invention, a memory controller for controlling access to a flash memory based on a command provided from a host system, the memory controller includes: a processor; a RAM; and a mask ROM in which a first firmware is written, wherein the memory controller is configured to: perform a search for a second firmware written in the flash memory based on the first firmware at a start-up time; and write a third firmware provided from the host system in the RAM when the second firmware is not found through the search and perform an initialization based on the third firmware written in the RAM.

Also, according to an aspect of the present invention, a memory system includes: a flash memory; and a memory controller configured to control access to the flash memory based on a command provided from a host system, wherein the memory controller comprises: a processor; a RAM; and a mask ROM in which a first firmware is written, wherein the memory controller is configured to: perform a search for a second firmware written in the flash memory based on the first firmware at a start-up time; and write a third firmware provided from the host system in the RAM when the second firmware is not found through the search and perform an initialization based on the third firmware written in the RAM.

According to the present invention, it is possible to reduce both a storage area of the first RAM and a storage area in which firmware is stored in a storage area of the flash memory.

DETAILED DESCRIPTION OF THE INVENTION

<Embodiments>

Hereinafter, embodiments of the present invention will be described with reference to the drawings.

<Configuration of memory system>

Figure 1:
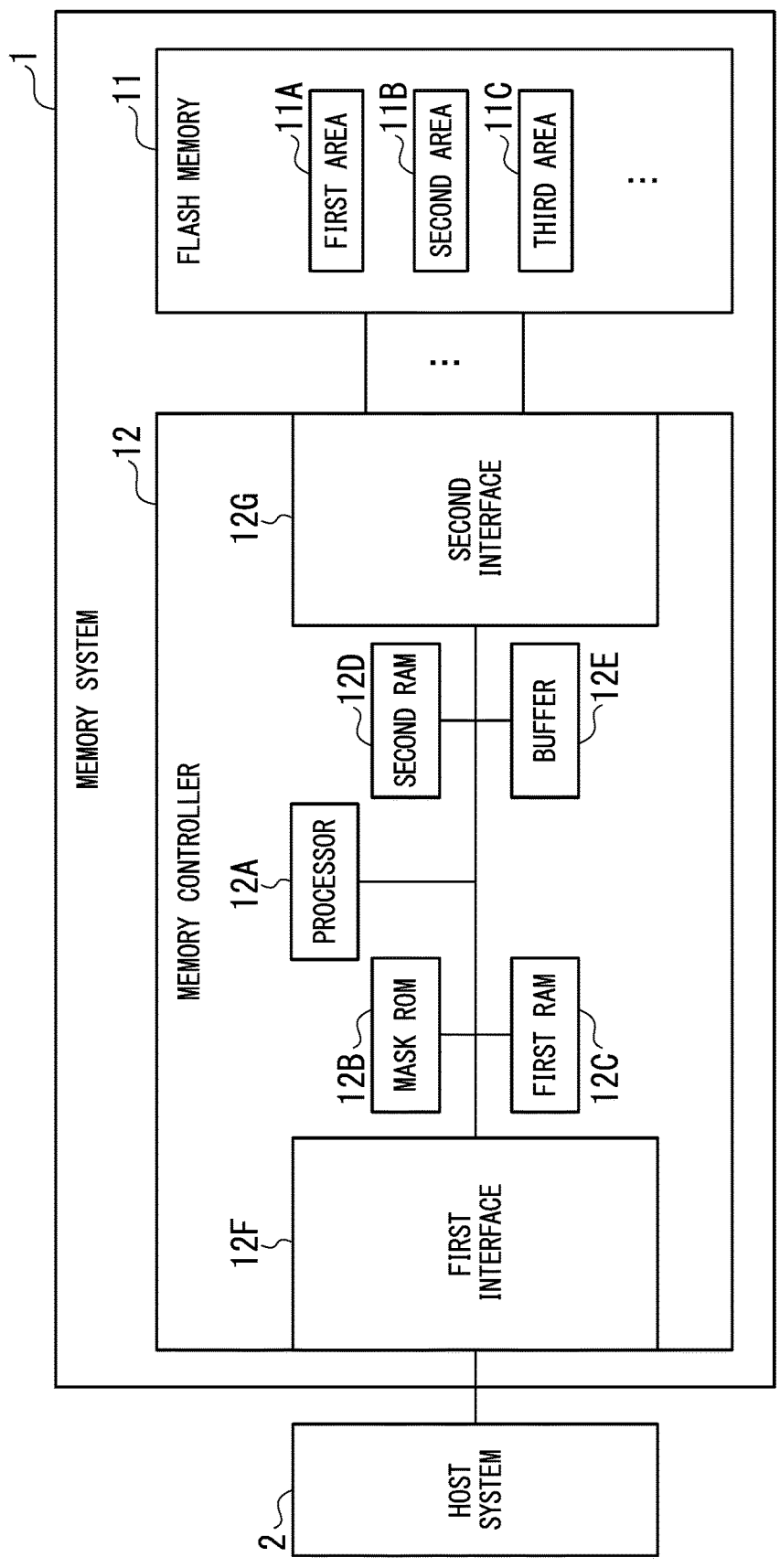
FIG. 1 is a block diagram showing an example of a configuration of a memory system 1 related to an embodiment.

FIG. 1 is a block diagram showing an example of a configuration of a memory system 1 related to an embodiment.

The memory system 1 is connected to a host system 2.

The memory system 1 includes a flash memory 11 and a memory controller 12.

In an embodiment, software which causes the memory controller 12 to perform a process of starting the memory system 1 will be described as first firmware.

Also, in an embodiment, software which causes the memory controller 12 to perform a process of controlling access to the flash memory 11 will be described as second firmware.

Also, in an embodiment, software which is transmitted from the host system 2 to the memory system 1 and causes the memory controller 12 to initialize the memory system 1 will be described as third firmware.

The flash memory 11 may be any of a variety of flash memories. For example, each cell included in the flash memory 11 may be a single-level cell (SLC), a multi-level cell (MLC), or a triple-level cell (TLC).

In an embodiment, a case in which the flash memory 11 is a NAND-type flash memory will be described as an example. As another example, the flash memory 11 may be a NOR-type flash memory.

The flash memory 11 includes one or more chips. The one or more chips included in the flash memory 11 are connected to the memory controller 12 by one or more signal lines referred to as channels. In this configuration, the number of chips included in the flash memory 11 may or may not be equal to the number of channels connected between the flash memory 11 and the memory controller 12.

Each chip included in the flash memory 11 includes a plurality of blocks. In the memory system 1, data stored in the flash memory 11 is removed in units of blocks. Also, each of the plurality of blocks includes a plurality of pages. In the memory system 1, data writing in the flash memory 11 or data reading from the flash memory 11 is performed in units of pages. Also, each of the plurality of pages includes a plurality of cells. A storage area of the flash memory 11 is composed of a group of such cells. Since chips, blocks, and pages are well known, further detailed description thereof is omitted.

The flash memory 11 is controlled by the memory controller 12. In an embodiment, at least a part of the storage area of the flash memory 11 is designated as any one of a first area 11A to a third area 11C by the memory controller 12. In the storage area of the flash memory 11, each of the first area 11A to the third area 11C may be a storage area composed of cells included in two or more blocks, a storage area composed of all cells included in a single block, or a storage area composed of some cells included in a single block.

The first area 11A is an area in which the second firmware is written by the memory controller 12 in the storage area of the flash memory 11.

The second area 11B is an area in which management information is written by the memory controller 12 in the storage area of the flash memory 11. The management information includes information such as information representing the position of the first area 11A in the flash memory 11, information representing the position of the third area 11C in the flash memory 11, information representing the type of the flash memory 11, setting information of the memory system 1, and the like.

The setting information of the memory system 1 may include one or more of, for example, information representing the number of chips included in the flash memory 11, command support information, function support information, and the like.

Also, information representing a position in the flash memory 11 may be, for example, information on an address in the flash memory 11.

Also, the information representing the type of the flash memory 11 may include, for example, information representing the number of blocks included in in the flash memory 11, information representing the number of pages included in a single block of the blocks, information representing the maximum number of bytes that can be stored in a single page (i.e., one page) of the pages, and the like.

The third area 11C is an area in which data received from the host system 2 is written by the memory controller 12 in the storage area of the flash memory 11.

The storage area of the flash memory 11 may include, for example, an area in which information representing a correspondence relationship between a logic address designated by the host system 2 and a physical address in the flash memory 11 is written. Also, the area may be included in the above-described second area 11B.

In each of the first area 11A to the third area 11C, information for identifying which one of the first area 11A to the third area 11C is the corresponding area is written. For convenience of description, this information will be described below as area identification information.

The memory controller 12 controls access to the flash memory 11 based on a command provided from a host system 2.

The memory controller 12 includes a processor 12A, a mask ROM 12B, a first RAM (random access memory) 12C, a second RAM 12D, a buffer 12E, a first interface 12F, and a second interface 12G. In addition to these, the memory controller 12 may include other hardware function portions such as a register.

The processor 12A controls the overall memory system 1. In other words, the processor 12A controls operation of the memory controller 12. That is, operation of the memory controller 12 is operation of the processor 12A. The processor 12A is, for example, a CPU (central processing unit). Also, the processor 12A may be another processor, such as a FPGA (field-programmable gate array), in place of the CPU.

The mask ROM 12B is a ROM in which the first firmware is written. For this reason, in a start-up time of the memory controller 12, the mask ROM 12B is referenced by the memory controller 12. In other words, in the start-up time of the memory controller 12, the memory controller 12 references the mask ROM 12B and performs an operation based on the first firmware. The operation includes, for example, a search for the second firmware.

In an embodiment, a start-up time of the memory controller 12 is the timing at which a drive voltage is supplied to the processor 12A and the processor 12A becomes able to operate normally. For example, when the memory system 1 is removable equipment, the processor 12A is supplied with the drive voltage by connecting the memory system 1 to the host system 2. Also, for example, when the memory system 1 is not removable equipment, the processor 12A is supplied with the drive voltage by applying power to the host system 2 connected to the memory system 1.

The start-up time of the memory controller 12 may be a timing after the timing at which the processor 12A becomes able to operate normally.

Also, the start-up time of the memory controller 12 may be another timing according to the processor 12A in place of the timing at which the processor 12A becomes able to operate normally or a timing thereafter.

The first RAM 12C is a RAM in which the second firmware read from the first area 11A is written by the memory controller 12. Also, the first RAM 12C is a RAM in which the third firmware provided from the host system 2 is written by the memory controller 12.

The second RAM 12D is a RAM in which data required by the memory controller 12 among various kinds of data read from the flash memory 11 is written by the memory controller 12. For example, management information read from the second area 11B is written in the second RAM 12D by the memory controller 12.

For example, in a case where the memory controller 12 write data (reception data) received from the flash memory 11 by the memory controller 12, the buffer 12E temporarily holds the data. Also, for example, in a case where the memory controller 12 transmit data (transmission data) read from the flash memory 11 by the memory controller 12 to the host system 2, the buffer 12E temporarily holds the data. Operation of the buffer 12E is identical to operation of already known buffers. For this reason, further detailed description of the buffer 12E is omitted.

The first interface 12F communicably connects the memory controller 12 and the host system 2. The first interface 12F may be any interface as long as it is possible to communicably connect the memory controller 12 and the host system 2.

The second interface 12G connects the memory controller 12 and the flash memory 11. The second interface 12G may be any interface as long as it is possible to communicably connect the memory controller 12 and the flash memory 11.

The host system 2 may be arbitrary equipment, for example, industrial equipment which operates on a certain operating system (OS) such as a workstation. As another example, in place of industrial equipment, the host system 2 may be household equipment, such as a personal computer (PC), or equipment such as a multifunctional mobile phone terminal (a smart phone).

In an embodiment, the memory system 1 stores data received from the host system 2 in the flash memory 11 according to a request from the host system 2. Also, according to a request from the host system 2, the memory system 1 transmits data corresponding to the request among data stored in the flash memory 11 to the host system 2.

As described above, when in the start-up time of the memory controller 12, the memory controller 12 performs an operation based on the first firmware stored in the mask ROM 12B by referring to the mask ROM 12B. At this time, the memory controller 12 searches for the second firmware written in the flash memory 11.

When the second firmware written in the flash memory 11 is detected in the search for the second firmware, the memory controller 12 reads out the detected second firmware to the first RAM 12C. After that, the memory controller 12 switches a reference from the mask ROM 12B to the first RAM 12C and performs power-on reset based on the second firmware read out to the first RAM 12C. Then, after the power-on reset is finished normally, the memory controller 12 controls access to the flash memory 11 requested by the host system 2 based on the second firmware read out to the first RAM 12C. Processing requested by the host system 2 after the power-on reset is finished normally includes not only the process of controlling access to the flash memory 11 but also other processes. However, in embodiments, description of the other processes is omitted.

Meanwhile, when the memory controller 12 cannot detect the second firmware written in the flash memory 11 in the search for the second firmware, the memory controller 12 transmits error information to the host system 2. The error information is information for the host system 2 to determine that the memory controller 12 cannot detect the second firmware written in the flash memory 11. When the host system 2 is received the error information, the host system 2 transmits (issues) a command that the host system 2 transmit firmware to the memory controller 12 to the memory controller 12. When the memory controller 12 is received the command that the host system 2 transmit firmware to the memory controller 12, the memory controller 12 transmits information for permitting firmware reception to the host system 2 in response to the command. When the host system 2 is received the information, the host system 2 transmits the third firmware to the memory system 1.

When the memory controller 12 is received the third firmware from the host system 2, the memory controller 12 writes the received third firmware (i.e., the third firmware provided from the host system 2) in the first RAM 12C. After that, the memory controller 12 switches the reference from the mask ROM 12B to the first RAM 12C and starts operation based on the third firmware written in the first RAM 12C. Then, the memory controller 12 initializes the memory system 1 according to a request from the host system 2. The operation of the memory controller 12 related to initialization of the memory system 1 will be described in detail later. In the initialization of the memory system 1, the memory controller 12 receives the second firmware from the host system 2 and stores the received second firmware in the flash memory 11.

In this way, the memory system 1 initializes the flash memory 11 based on the third firmware provided from the host system 2. In other words, in the memory system 1, the third firmware is not required to be written in the flash memory 11. For this reason, in the memory system 1, it is possible to reduce the storage capacity of the first RAM 12C in comparison with a configuration in which the third firmware is written in the flash memory 11. Also, it is possible to prevent the storage area of the flash memory 11 from being reduced to the extent of the third firmware. Processing performed by each of the memory controller 12 and the host system 2 in the case of initializing the flash memory 11 will be described in detail below. Also, processing performed by each of the memory controller 12 and the host system 2 in the case of performing the initialization will be described below with an example of performing the initialization when the memory controller 12 starts. In embodiments, description of other processing is omitted.

<Processing Performed by Memory Controller When Start-Up Time of Memory Controller>

Figure 2:
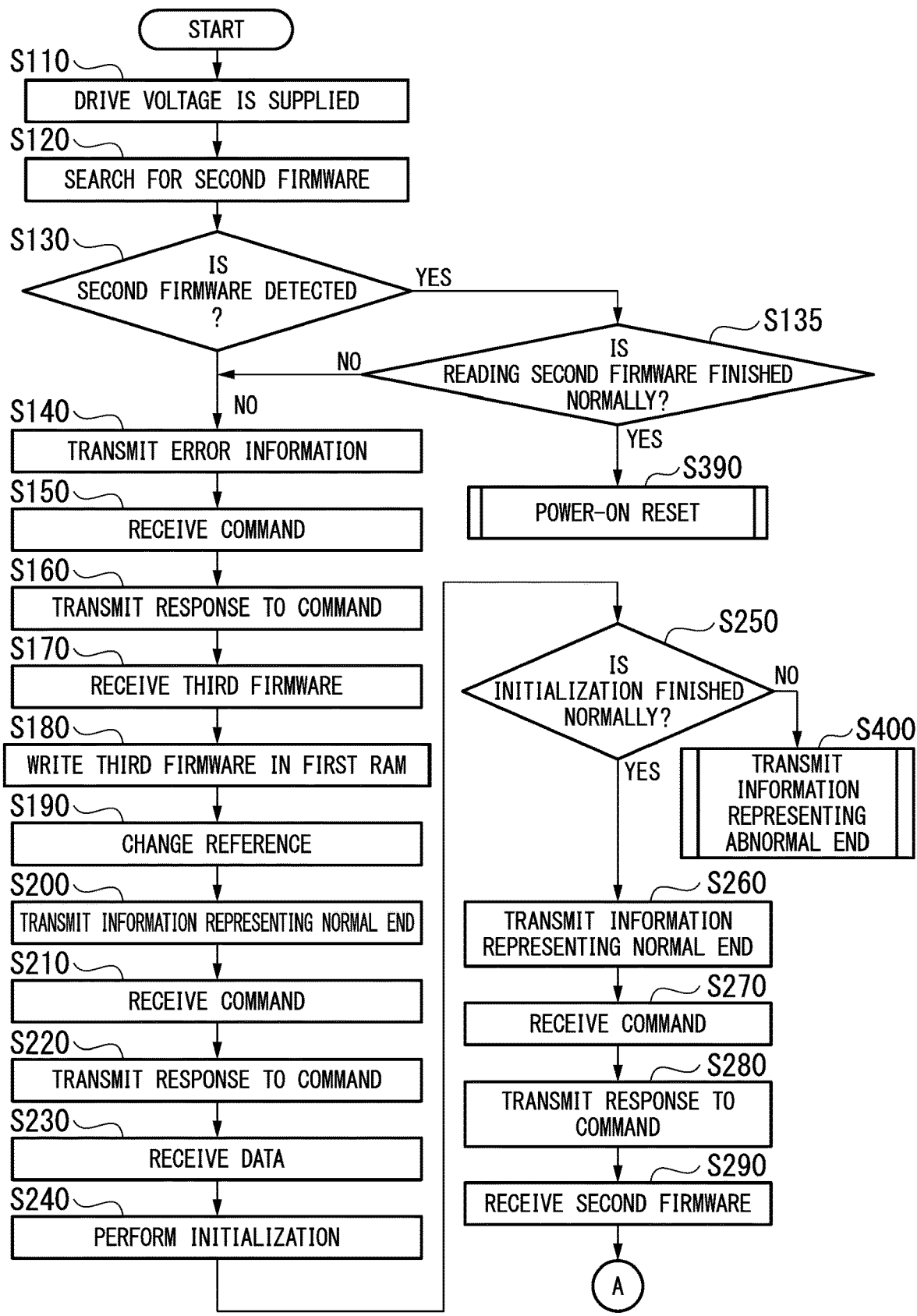
FIG. 2 is a flowchart showing an example of processing performed by a memory controller 12 in the case of starting the memory controller 12.
Figure 3:
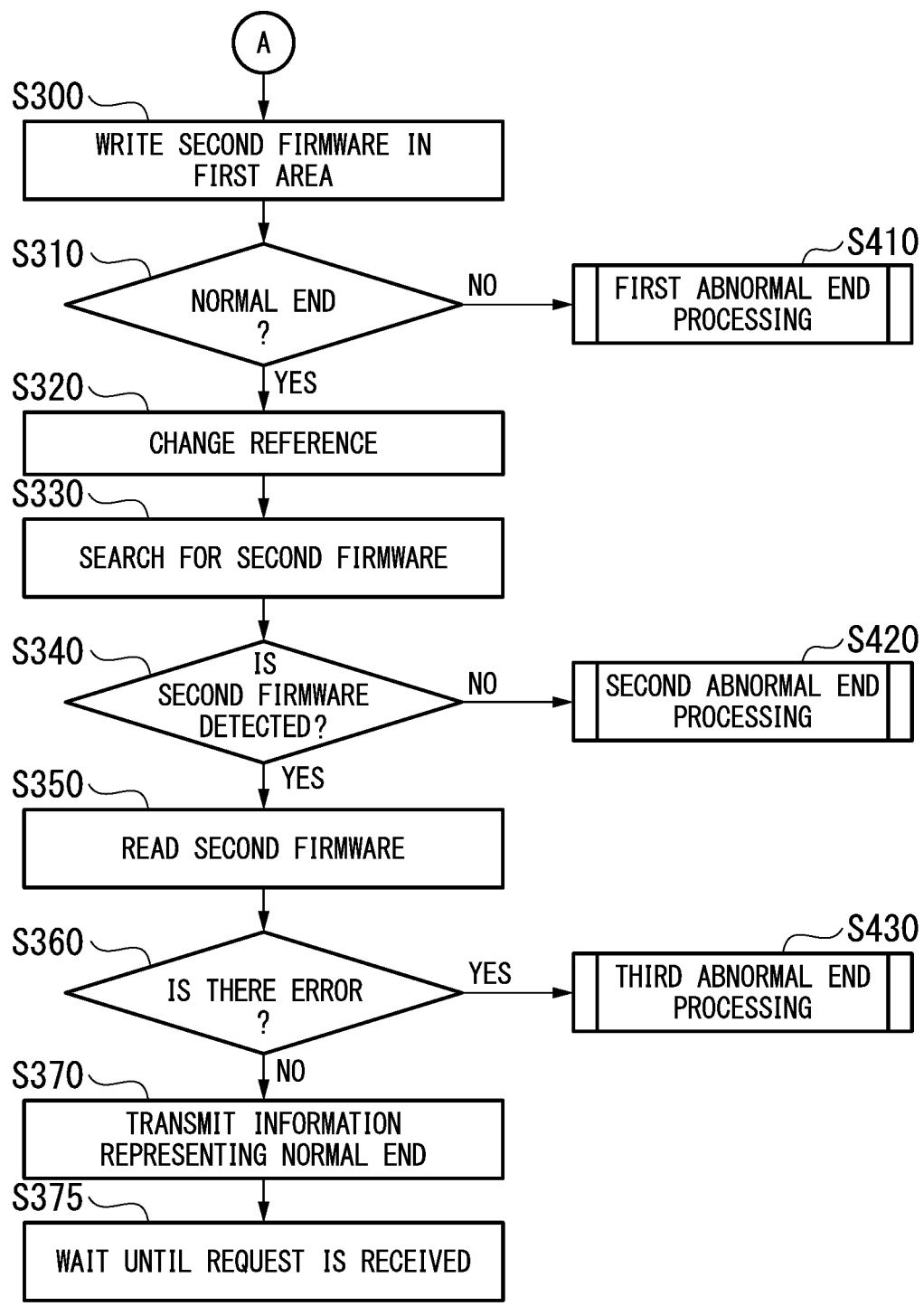
FIG. 3 is a flowchart showing an example of processing performed by the memory controller 12 in the case of starting the memory controller 12.

Processing performed by the memory controller 12 when the memory controller 12 starts will be described below with reference to FIGS. 2 and 3. FIGS. 2 and 3 are flowcharts showing an example of the flow of processing performed by the memory controller 12 when the start-up of the memory controller 12.

When the memory controller 12 is started, the memory controller 12 is supplied with a drive voltage (step S110).

Subsequently, the memory controller 12 refers to the first firmware written in the mask ROM 12B and searches for the second firmware written in the flash memory 11 based on the first firmware (step S120).

A method of searching for the second firmware may be an already known method or a method that is developed in the future. For example, in step S120, the memory controller 12 searches the second area 11B in the flash memory 11 and reads out management information written in the second area 11B to the second RAM 12D. The memory controller 12 specifies the position of the first area 11A in the flash memory 11 based on the management information read out to the second RAM 12D. The memory controller 12 searches the second firmware in the first area 11A based on the specified position.

After the processing of step S120 is performed, the memory controller 12 determines whether the second firmware is detected through the search performed in step S120 (step S130). The processing of step S130 will be described now.

For example, when the second area 11B is not detected in the flash memory 11 in step S120, the memory controller 12 determines in step S130 that the second firmware is not detected. Also, for example, when the second firmware is not written in the second area 11B in step S120, the memory controller 12 determines in step S130 that the second firmware is not detected. When it is not possible to access the second firmware for a reason other than these cases in step S120, the memory controller 12 may determine in step S130 that the second firmware is not detected. Even when it is not possible to access the second firmware for a reason other than these cases in step S120, the memory controller 12 may determine in step S130 that the second firmware is not detected.

When the memory controller 12 determined that the second firmware is detected (step S130—YES), the memory controller 12 reads out the second firmware from the flash memory 11 (i.e., from the first area 11A) to the first RAM 12C. Then, the memory controller 12 determines whether reading out of the second firmware to the first RAM 12C is finished normally (step S135).

When the memory controller 12 determined that reading out of the second firmware to the first RAM 12C is finished normally (step S135—YES), the memory controller 12 switches the reference of firmware from the mask ROM 12B to the first RAM 12C. Then, the memory controller 12 performs power-on reset on based on the second firmware read out to the first RAM 12C (step S390). After performing the power-on reset, the memory controller 12 finishes processing. After that, the memory controller 12 controls access to the flash memory 11 based on various kinds of commands provided from the host system 2. In other words, after the power-on reset is performed, the memory controller 12 performs an operation corresponding to a request from the host system 2 based on the second firmware read out to the first RAM 12C. In embodiments, the power-on reset and a process in which the memory controller 12 controls the access based on the commands are not described in detail. For this reason, the flow of power-on reset is omitted in FIG. 2.

Meanwhile, when the memory controller 12 determined that reading out of the second firmware to the first RAM 12C is not finished normally (step S135—NO), the memory controller 12 transmits the above-described error information to the host system 2 (step S140).

Also, when the memory controller 12 determined in step S130 that the second firmware is not detected (step S130—NO), the memory controller 12 proceeds to step S140 and transmits the error information to the host system 2.

After the processing of step S140 is performed, the memory controller 12 waits until a request is received from the host system 2. A case in which, after the processing of step S140 is performed, the memory controller 12 receives, as the request, a command that the host system 2 transmit firmware to the memory controller 12 from the host system 2 (step S150) will be described as an example. Also, when the memory controller 12 received a command different from this command as the request from the host system 2 in step S150, the memory controller 12 performs processing corresponding to the received command Subsequently, the memory controller 12 is able to execute the content of the command received from the host system 2 in step S150 and transmits information representing that it is prepared to receive data as processing of the command to the host system 2 in response to the command (step S160). In this embodiment, an abnormal end caused by an error in the content of the command and processing involved in the abnormal end are not described.

Subsequently, the memory controller 12 waits until data is received from the host system 2. Then, the memory controller 12 receives data from the host system 2 (step S170). The data is the third firmware. However, the memory controller 12 does not determine whether the data received in step S170 is the third firmware.

Subsequently, the memory controller 12 writes the data (i.e., the third firmware) received in step S170 in the first RAM 12C (step S180). At this time, the memory controller 12 may write the data in the first RAM 12C by passing through the buffer 12E or without passing through the buffer 12E.

Subsequently, the memory controller 12 switches the reference of firmware from the mask ROM 12B to the first RAM 12C (step S190) and starts an operation based on data written in the first RAM 12C, that is, the third firmware written in the first RAM 12C.

Subsequently, the memory controller 12 transmits information representing a normal end of the command received in step S150 to the host system 2 (step S200).

Subsequently, the memory controller 12 waits until a request is received from the host system 2. A case in which, after the processing of step S200 is performed, the memory controller 12 receives, as the request, a command that causes the memory controller 12 to initialize the memory system 1 from the host system 2 (step S210) will be described as an example. Also, when the memory controller 12 is received a command different from this command as the request from the host system 2 in step S210, the memory controller 12 performs processing corresponding to the received command.

Subsequently, the memory controller 12 is able to execute the content of the command received from the host system 2 in step S210 and transmits information representing that it is prepared to receive data as processing of the command to the host system 2 in response to the command (step S220). In this embodiment, an abnormal end caused by an error in the content of the command and processing involved in the abnormal end are not described.

Subsequently, the memory controller 12 waits until data is received from the host system 2. Then, the memory controller 12 receives data from the host system 2 (step S230). Then, the memory controller 12 writes the received data in the buffer 12E. The memory controller 12 checks what kind of data the data written in the buffer 12E is. The data is data required for initializing the memory system 1. In other words, the memory controller 12 specifies that the data written in the buffer 12E is data required for initializing the memory system 1 through this check. In step S230, after the memory controller 12 wrote the data in the buffer 12E, the memory controller 12 transmits the data written in the buffer 12E from the buffer 12E to the second RAM 12D.

Subsequently, the memory controller 12 initializes the memory system 1 using the data written in the second RAM 12D in step S230 based on the third firmware written in the first RAM 12C in step S180 (step S240). Initialization of the memory system 1 performed by the memory controller 12 in step S240 will be described here.

Initialization of the memory system 1 is initialization of the flash memory 11 performed by the memory controller 12. In the initialization, the memory controller 12 designates areas which are each caused to function as the first area 11A, the second area 11B, and the third area 11C in at least a part of the storage area of the flash memory 11. In other words, the memory controller 12 generates each of the first area 11A, the second area 11B, and the third area 11C in the storage area of the flash memory 11. Then, the memory controller 12 generates the above-described management information using the data received in step S230. The memory controller 12 writes the generated management information in the generated second area 11B. In this way, the memory controller 12 performs the process from designating each of the first area 11A, the second area 11B, and the third area 11C to writing the generated management information in the second area 11B in the initialization. In addition to the process, another process may be included in the initialization. Actual initialization of the memory system 1 includes a process of detecting a defective block included in the flash memory 11 and the like, but description thereof is omitted for the sake of brevity.

After the memory system 1 is initialized, the memory controller 12 determines whether the initialization has been finished normally (step S250). For example, when the process from designating each of the first area 11A, the second area 11B, and the third area 11C to writing the generated management information in the second area 11B is successful, the memory controller 12 determines that the initialization has been finished normally. On the other hand, when at least a part of the process from designating each of the first area 11A, the second area 11B, and the third area 11C to writing the generated management information in the second area 11B is failure, the memory controller 12 determines that the initialization has not been finished normally.

When it is determined that the initialization of the memory system 1 has not been finished normally (step S250—NO), the memory controller 12 outputs information representing the abnormal end of the command received from the host system 2 in step S210 to the host system 2 (step S400). After that, the memory controller 12 performs recovery processing according to a request from the host system 2. The recovery processing is, for example, a process of performing the initialization process again and the like. The content of the recovery process varies according to the host system 2, and thus further description thereof is omitted. For this reason, the flow of processing performed by the memory controller 12 after step S400 is omitted in FIG. 2.

On the other hand, when it is determined that the initialization of the memory system 1 has been finished normally (step S250—YES), the memory controller 12 transmits information representing the normal end of the command received from the host system 2 in step S210 to the host system 2 (step S260).

Subsequently, the memory controller 12 waits until a request is received from the host system 2. A case in which after the processing of step S260 is performed, the memory controller 12 receives, as the request, a command that the host system 2 transmit firmware to the memory controller 12 from the host system 2 (step S270) will be described as an example. Also, when a command different from the command is received as the request from the host system 2 in step S270, the memory controller 12 performs processing corresponding to the received command.

Subsequently, the memory controller 12 is able to execute the content of the command received from the host system 2 in step S270 and transmits information representing that it is prepared to receive data as processing of the command to the host system 2 in response to the command (step S280). In this embodiment, an abnormal end caused by an error in the content of the command and processing involved in the abnormal end are not described.

Subsequently, the memory controller 12 waits until data is received from the host system 2. And, the memory controller 12 receives data from the host system 2 (step S290). The data is the second firmware. However, the memory controller 12 does not determine whether the data received in step S290 is the second firmware.

Subsequently, the memory controller 12 writes the data (i.e., the second firmware) received in step S290 to the buffer 12E. And, the memory controller 12 writes the data written in the buffer 12E to the first area 11A of the flash memory 11 (step S300). At this time, the memory controller 12 may write the data in the first area 11A by passing through the buffer 12E or without passing through the buffer 12E.

Subsequently, the memory controller 12 determines whether the data writing in the first area 11A has been finished normally in step S300 (step S310).

When it is determined that the data writing in the first area 11A has not been finished normally in step S300 (step S310—NO), the memory controller 12 performs first abnormal end processing (step S410). The first abnormal end processing includes, for example, a process of transmitting information representing that writing the second firmware in the first area 11A has not been finished normally to the host system 2. In this embodiment, further details of the first abnormal end processing are omitted. For this reason, the flow of the first abnormal end processing is omitted in FIG. 3.

On the other hand, when it is determined that the data writing in the first area 11A has been finished normally in step S300 (step S310—YES), the memory controller 12 switches the reference of firmware from the first RAM 12C to the mask ROM 12B (step S320) and starts operation based on the data written in the mask ROM 12B, that is, the first firmware written in the mask ROM 12B.

Subsequently, the memory controller 12 searches for the second firmware written in the flash memory 11 based on the first firmware (step S330). Since the processing of step S330 is the same as the processing of step S120, the description is omitted.

Subsequently, the memory controller 12 determines whether the second firmware is detected in step S330 (step S340).

When it is determined that the second firmware is not detected in step S330 (step S340—NO), the memory controller 12 performs second abnormal end processing (step S420). The second abnormal end processing includes, for example, a process of transmitting information representing the abnormal end of the command received from the host system 2 in step S270 to the host system 2. In this embodiment, further details of the second abnormal end processing are omitted. For this reason, the flow of the second abnormal end processing is omitted in FIG. 3.

On the other hand, when it is determined that the second firmware is detected in step S330 (step S340—YES), the memory controller 12 reads out the second firmware (i.e., the second firmware stored in the flash memory 11) detected in step S330 to the first RAM 12C (step S350).

Subsequently, the memory controller 12 determines whether there is an error in the memory system 1 (step S360). For example, the memory controller 12 determines whether the second firmware stored in the flash memory 11 is not read out to the first RAM 12C normally, whether required data is not read from the flash memory 11, whether data read from the flash memory 11 is not in a normal state, and the like. When these problems occur, the memory controller 12 determines that there is an error in the memory system 1.

When it is determined that there is an error in the memory system 1 (step S360—YES), the memory controller 12 performs third abnormal end processing (step S430). The third abnormal end processing includes, for example, a process of transmitting information representing the abnormal end of the command received from the host system 2 in step S270 to the host system 2. In this embodiment, further details of the third abnormal end processing are omitted. For this reason, the flow of the third abnormal end processing is omitted in FIG. 3.

On the other hand, when it is determined that there is no error in the memory system 1 (step S360—NO), the memory controller 12 switches the reference of firmware from the mask ROM 12B to the first RAM 12C. Then, the memory controller 12 transmits information representing the normal end of the command received from the host system 2 in step S270 to the host system 2 based on the second firmware read out to the first RAM 12C (step S370). In practice, in step S370, the memory controller 12 performs a process of building the memory system 1, a process of determining whether the system building has been finished normally, and the like, but description of these processes is omitted.

After that, the memory controller 12 waits until a request is received from the host system 2 (step S375). Description of processing performed by the memory controller 12 after the processing of step S375 is omitted. For this reason, the flow of the corresponding processing is omitted in FIG. 3.

As described above, when the second firmware is not detected in a storage area of the flash memory 11 (i.e., when the second firmware is not detected) at the start-up time, the memory controller 12 initializes the memory system 1 according to a request from the host system 2 and writes the second firmware in the flash memory 11. In other words, in the memory system 1 including the memory controller 12, it is unnecessary to write the second firmware and the third firmware both in the first RAM 12C at the same time, and also it is unnecessary to write the third firmware in the flash memory 11. For this reason, in the memory system 1, it is possible to reduce both the storage area of the first RAM 12C and a part of the storage area of the flash memory 11 in which firmware is stored.

<Processing Performed by Host System When Memory System Cannot Detect Second Firmware in Search for Second Firmware>

Figure 4:
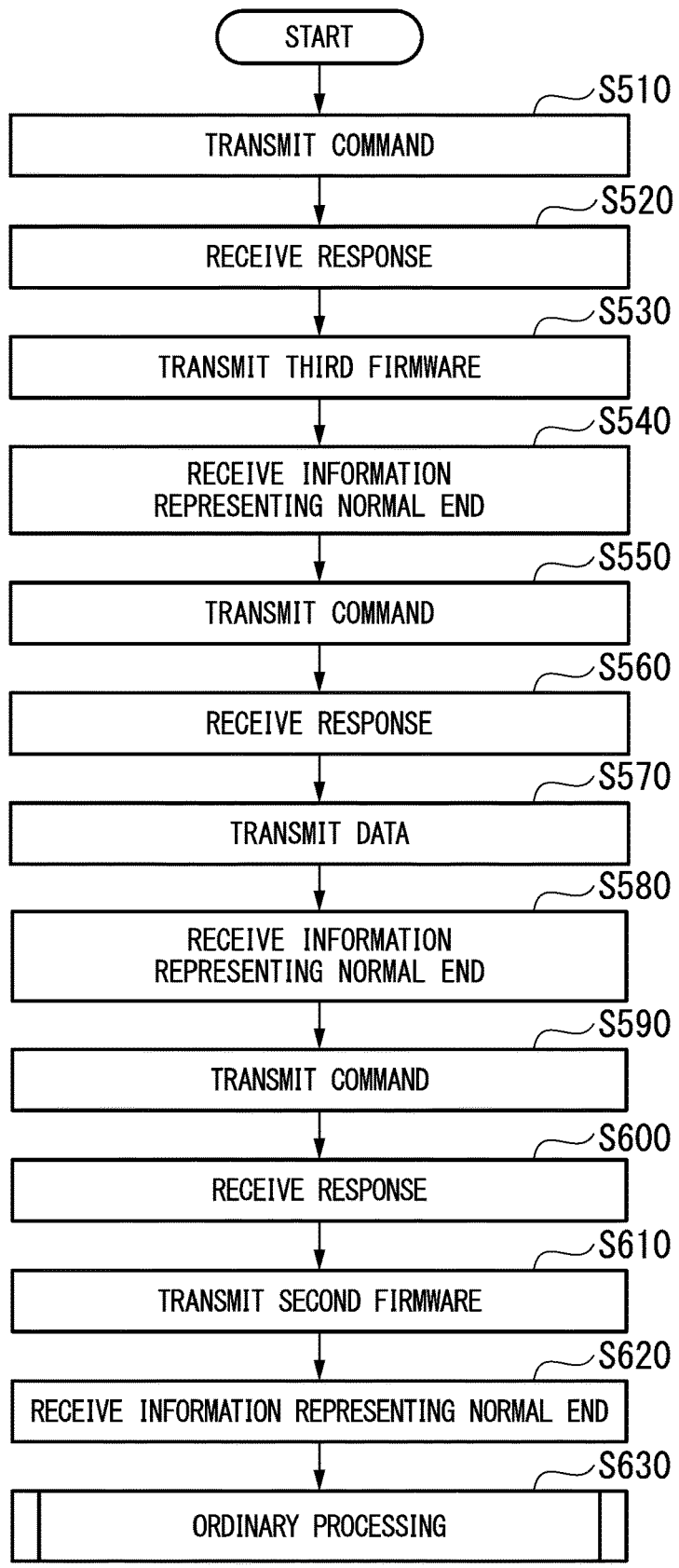
FIG. 4 is a flowchart showing an example of processing performed by a host system 2 when the memory controller 12 cannot find second firmware in a search for the second firmware.

Hereinafter, processing performed by the host system 2 when the memory system 1 (i.e., the memory controller 12) cannot detect the second firmware in the search for the second firmware in step S120 shown in FIG. 2 will be described with reference to FIG. 4. FIG. 4 is a flowchart showing an example of processing performed by the host system 2 when the memory system 1 cannot detect the second firmware in the search for the second firmware in step S120 shown in FIG. 2.

After error information is received from the memory system 1, the host system 2 transmits (issues) a command that firmware be transmitted to the memory system 1 (step S510). The command transmitted to the memory system 1 by the host system 2 in step S510 is the command which is received by the memory controller 12 in step S150 shown in FIG. 2 (i.e., the command received by the memory system 1). In this embodiment, an abnormal end caused by an error in the content of the command and processing involved in the abnormal end are not described.

Subsequently, the host system 2 waits until information representing that the memory system 1 is able to execute the content of the command and prepared to receive data as processing of the command is received from the memory system 1 in response to the command transmitted to the memory system 1 in step S510. And, the host system 2 receives the response (i.e., the corresponding information) from the memory system 1 (step S520).

Subsequently, the host system 2 transmits the third firmware to the memory system 1 (step S530).

Subsequently, the host system 2 waits until information representing a normal end of the command transmitted to the memory system 1 in step S510 is received from the memory system 1. And, the host system 2 receives the information from the memory system 1 (step S540).

Subsequently, the host system 2 transmits (issues) a command that causes the memory system 1 (i.e., the memory controller 12) to initialize the memory system 1 to the memory system 1 (step S550). In this embodiment, an abnormal end caused by an error in the content of the command and processing involved in the abnormal end are not described.

Subsequently, the host system 2 waits until information representing that the memory system 1 is able to execute the content of the command and prepared to receive data as processing of the command is received from the memory system 1 in response to the command transmitted to the memory system 1 in step S550. And, the host system 2 receives the response (i.e., the information) from the memory system 1 (step S560).

Subsequently, the host system 2 transmits data required for initializing the memory system 1 to the memory system 1 (step S570).

Subsequently, the host system 2 waits until information representing a normal end or abnormal end of the command transmitted to the memory system 1 in step S550 is received from the memory system 1. And, the host system 2 receives the information from the memory system 1 (step S580). A case in which the host system 2 has received information representing the normal end from the memory system 1 will be described below as an example. Also, description of processing regarding a case in which the host system 2 has received information representing the abnormal end from the memory system 1 will be omitted below.

Subsequently, the host system 2 transmits (issues) a command that firmware be transmitted to the memory system 1 (step S590). The command transmitted from the host system 2 to the memory system 1 in step S590 is the command which is received by the memory controller 12 in step S280 shown in FIG. 2 (i.e., the command received by the memory system 1). In this embodiment, an abnormal end caused by an error in the content of the command and processing involved in the abnormal end are not described.

Subsequently, the host system 2 waits until information representing that the memory system 1 is able to execute the content of the command and prepared to receive data as processing of the command is received from the memory system 1 in response to the command transmitted to the memory controller 12 in step S590. And, the host system 2 receives the response (i.e., the information) from the memory system 1 (step S600).

Subsequently, the host system 2 transmits the second firmware to the memory system 1 (step S610).

Subsequently, the host system 2 waits until information representing a normal end or abnormal end of the command transmitted to the memory system 1 in step S590 is received from the memory system 1. And, the host system 2 receives the information from the memory system 1 (step S620). A case in which the host system 2 has received information representing the normal end from the memory system 1 will be described below as an example. Also, description of processing regarding a case in which the host system 2 has received information representing the abnormal end from the memory system 1 will be omitted below.

Subsequently, the host system 2 performs ordinary processing (step S630). The ordinary processing performed by the host system 2 in step S630 includes, for example, a process of writing various kinds of data, a process of reading various kinds of data, and the like according to a user's operation. In this embodiment, further details of the ordinary processing are omitted. For this reason, the flow of the ordinary processing is omitted in FIG. 4.

When information representing a normal end is received from the memory system 1 instead of error information at a timing before the processing of step S510 is performed, the host system 2 proceeds to step S630 and performs the ordinary processing. The information is information representing that the search for the second firmware has been finished normally (i.e., the second firmware is detected) in the processing of step S120. The information is information transmitted from the memory controller 12 to the host system 2 when the second firmware is found in step S130.

In this way, when the memory system 1 (i.e., the memory controller 12) cannot detect the second firmware in the search for the second firmware in step S120 shown in FIG. 2, the host system 2 causes the memory system 1 to initialize the memory system 1 and causes the memory system 1 to write the second firmware in the flash memory 11. Accordingly, the memory system 1 does not need to write the second firmware and the third firmware both in the first RAM 12C at the same time and also does not need to write the third firmware in the flash memory 11. For this reason, in the memory system 1, it is possible to reduce both the storage area of the first RAM 12C and a part of the storage area of the flash memory 11 in which firmware is stored.

As described above, a memory controller related to embodiments (the memory controller 12 in the embodiment described above) for controlling access to a flash memory (the flash memory 11 in the embodiment described above) based on a command provided from a host system (the host system 2 in the embodiment described above), the memory controller includes: a processor (the processor 12A in the embodiment described above), a RAM (the first RAM 12C in the embodiment described above), and a mask ROM (the mask ROM 12B in the embodiment described above) in which a first firmware is written, wherein the memory controller is configured to: perform a search for a second firmware written in the flash memory based on the first firmware at a start-up time; and write a third firmware provided from the host system in the RAM when the second firmware is not found through the search and perform an initialization based on the third firmware written in the RAM. Accordingly, the memory controller can reduce both the storage area of the first RAM and a part of the storage area of the flash memory in which firmware is stored.

The memory controller may employ a configuration which processing performed in the initialization includes a process to designate an area in which the second firmware is written (the first area 11A in the embodiment described above) in a storage area of the flash memory and a process to write the second firmware provided from the host system in the designated area.

Also, the memory controller may be configured to: transmit error information to the host system when the second firmware is not found through the search; and be provided the third firmware from the host system after receiving a command that the host system transmit firmware to the memory controller.

Further, the memory controller may be configured to start operation on the basis of the second firmware after the initialization is performed.

Embodiments of the present invention have been described in detail above with reference to the drawings. However, the detailed configuration is not limited to these embodiments and may be changed, replaced, deleted, or the like without departing from the gist of the present invention.

A program for implementing a function of an arbitrary component in the above-described device (e.g., the memory controller 12) may be recorded in a computer-readable recording medium, and the program may be read and executed by a computer system. The "computer system" mentioned herein includes an OS and hardware, such as peripheral devices. Also, the "computer-readable recording medium" indicates a portable medium, such as a flexible disk, a magneto-optical disk, a ROM, or a compact disk (CD)-ROM, a storage device, such as a hard disk embedded in the computer system. Further, the "computer-readable recording medium" may include a medium that holds a program for a certain period of time such as a volatile memory (RAM) in a computer system which is a server or a client of a case in which the program is transmitted via a network such as the Internet or a communication network such as a telephone network.

Also, the program may be transmitted from a computer system which stores the program in a storage device and the like to another computer system via a transmission medium or a carrier wave passing through the transmission medium. The "transmission medium" which transmits the program indicates a medium having a function of transmitting information, such as a network (a communication network) including the Internet or the like or a communication network (a communication line) including a telephone network or the like.

Further, the program may be a program for implementing some of the above-described functions. In addition, the program may be a program which can implement the above-described functions in combination with the program already recorded in the computer system, that is, a differential file (a differential program).

EXPLANATION OF REFERENCES

1 Memory system
2 Host system
11 Flash memory
11A First area
11B Second area
11C Third area
12 Memory controller
12A Processor
12B Mask ROM
12C First RAM
12D Second RAM
12E Buffer

What is claimed is:

1. A memory controller for controlling access to a flash memory based on a command provided from a host system, the memory controller comprising:

a processor;
a RAM (random access memory); and
a mask ROM (read only memory) in which a first firmware is written,
wherein the memory controller is configured to:
perform a search using the first firmware at a start-up time to determine if a second firmware is detected in the flash memory;
retrieve a third firmware from the host system and write the third firmware to the RAM if the second firmware is not detected in the flash memory; and
perform an initialization based on the third firmware written to the RAM,
wherein the first firmware is software which causes the memory controller to perform a process of searching for the second firmware in the flash memory at the start-up time,
wherein the second firmware is software which causes the memory controller to perform a process of controlling access to the flash memory, and is not able to cause the memory controller to initialize the flash memory, and
the third firmware is software which causes the memory controller to initialize the flash memory, and is not able to cause the memory controller to perform the process of controlling access to the flash memory.

2. The memory controller according to claim 1, wherein the memory controller is configured to, if the second firmware is not present in the flash memory,
perform the initialization so as to include a process to designate a storage area for the second firmware in the flash memory and a process to retrieve the second firmware from the host system and write the second firmware to the storage area.

3. The memory controller according to claim 1, wherein the memory controller is configured to:
transmit error information to the host system when the second firmware is not present in the flash memory; and
receive the third firmware from the host system after the memory controller receives a command from the host system to transmit firmware.

4. The memory controller according to claim 2, wherein the memory controller is configured to:
transmit error information to the host system when the second firmware is not present in the flash memory; and
receive the third firmware from the host system after the memory controller receives a command from the host system to transmit firmware.

5. The memory controller according to claim 2, wherein the memory controller is configured to:
start operation based on the second firmware after writing the second firmware to the storage area.

6. The memory controller according to claim 4, wherein the memory controller is configured to:
start operation based on the second firmware after writing the second firmware to the storage area.

7. A memory system comprising:
a flash memory; and
a memory controller configured to control access to the flash memory based on a command provided from a host system,
wherein the memory controller comprises:
a processor;
a RAM (random access memory); and
a mask ROM (read only memory) in which a first firmware is written,
wherein the memory controller is configured to:
perform a search using the first firmware at a start-up time to determine if a second firmware is detected in the flash memory;
retrieve a third firmware from the host system and write the third firmware to the RAM if the second firmware is not detected in the flash memory; and
perform an initialization based on the third firmware written to the RAM,
wherein the first firmware is software which causes the memory controller to perform a process of searching for the second firmware in the flash memory at the start-up time,
wherein the second firmware is software which causes the memory controller to perform a process of controlling access to the flash memory, and is not able to cause the memory controller to initialize the flash memory, and
the third firmware is software which causes the memory controller to initialize the flash memory, and is not able to cause the memory controller to perform the process of controlling access to the flash memory.

8. The memory system according to claim 7, wherein the memory controller is configured to, if the second firmware is not present in the flash memory,
perform the initialization so as to include a process to designate a storage area for the second firmware in the flash memory and a process to retrieve the second firmware from the host system and write the second firmware to the storage area.

9. The memory system according to claim 7, wherein the memory controller is configured to:
transmit error information to the host system when the second firmware is not present in the flash memory; and
receive the third firmware from the host system after the memory controller receives a command from the host system to transmit.

10. The memory system according to claim 8, wherein the memory controller is configured to:
transmit error information to the host system when the second firmware is not present in the flash memory; and
receive the third firmware from the host system after the memory controller receives a command from the host system to transmit firmware.

11. The memory system according to claim 8, wherein the memory controller is configured to:
start operation based on the second firmware after writing the second firmware to the storage area.

12. The memory system according to claim 10, wherein the memory controller is configured to:
start operation based on the second firmware after writing the second firmware to the storage area.

* * * * *